US009518378B2

(12) United States Patent
Takeuchi

(10) Patent No.: US 9,518,378 B2
(45) Date of Patent: Dec. 13, 2016

(54) FLUID PRESSURE CONTROL DEVICE

(71) Applicant: KAYABA INDUSTRY CO., LTD., Tokyo (JP)

(72) Inventor: Tooru Takeuchi, Kanagawa (JP)

(73) Assignee: KYB Corporation, Tokyo (JP)

( * ) Notice: Subject to any disclaimer, the term of this patent is extended or adjusted under 35 U.S.C. 154(b) by 286 days.

(21) Appl. No.: 14/384,399

(22) PCT Filed: Mar. 25, 2013

(86) PCT No.: PCT/JP2013/058549
§ 371 (c)(1),
(2) Date: Sep. 11, 2014

(87) PCT Pub. No.: WO2013/146666
PCT Pub. Date: Oct. 3, 2013

(65) Prior Publication Data
US 2015/0096291 A1 Apr. 9, 2015

(30) Foreign Application Priority Data
Mar. 27, 2012 (JP) .................................. 2012-070672

(51) Int. Cl.
F16D 31/02 (2006.01)
E02F 9/22 (2006.01)
(Continued)

(52) U.S. Cl.
CPC .......... E02F 9/2285 (2013.01); E02F 9/2203 (2013.01); E02F 9/2221 (2013.01); E02F 9/2225 (2013.01);
(Continued)

(58) Field of Classification Search
CPC ... F15B 11/003; F15B 11/044; F15B 11/0445; F15B 13/01; F15B 13/015; F15B 13/0422
See application file for complete search history.

(56) References Cited

U.S. PATENT DOCUMENTS 4,727,792 A 3/1988 Haussler
6,253,658 B1 * 7/2001 Kimura ................. F15B 11/003
91/447

(Continued)

FOREIGN PATENT DOCUMENTS

JP 05-106760 A 4/1993
JP 7-4969 U 1/1995
(Continued)

Primary Examiner — Michael Leslie
(74) Attorney, Agent, or Firm — Rabin & Berdo, P.C.

(57) ABSTRACT

A fluid pressure control device includes a switching valve that operates in conjunction with a control valve by a pilot pressure to switch an operation of an operated check valve. The switching valve includes a spool that moves according to the pilot pressure of a pilot chamber, and a piston that is accommodated in the pilot chamber and imparts a thrust force to the spool upon receiving the pilot pressure. The piston includes a first piston that is slidingly accommodated in the pilot chamber and is acted upon by the pilot pressure, and a second piston whose distal end faces the spool and is inserted into an accommodating hole formed in the first piston. A spherical protrusion is provided on a center of either one of a bottom surface of the accommodating hole of the first piston and a back surface of the second piston.

3 Claims, 8 Drawing Sheets

(51) Int. Cl.
  *F15B 13/01* (2006.01)
  *F15B 11/00* (2006.01)
  *F15B 11/044* (2006.01)
  *F16K 11/07* (2006.01)
  *F15B 13/02* (2006.01)
  *F15B 13/04* (2006.01)
  *F15B 13/042* (2006.01)

(52) U.S. Cl.
  CPC ........... *E02F 9/2267* (2013.01); *F15B 11/003* (2013.01); *F15B 11/044* (2013.01); *F15B 13/01* (2013.01); *F15B 13/021* (2013.01); *F15B 13/0402* (2013.01); *F15B 13/0422* (2013.01); *F16K 11/0716* (2013.01); *F15B 13/042* (2013.01); *F15B 2211/20576* (2013.01); *F15B 2211/30515* (2013.01); *F15B 2211/30565* (2013.01); *F15B 2211/3157* (2013.01); *F15B 2211/329* (2013.01); *F15B 2211/353* (2013.01); *F15B 2211/355* (2013.01); *F15B 2211/365* (2013.01); *F15B 2211/40515* (2013.01); *F15B 2211/41527* (2013.01); *F15B 2211/428* (2013.01); *F15B 2211/46* (2013.01); *F15B 2211/50545* (2013.01); *F15B 2211/5151* (2013.01); *F15B 2211/575* (2013.01); *F15B 2211/7053* (2013.01); *F15B 2211/715* (2013.01); *F15B 2211/761* (2013.01)

(56) References Cited

U.S. PATENT DOCUMENTS 6,691,510 B2 * 2/2004 Kariya ................. F15B 11/003
　　　　　　　　　　　　　　　　　　　　　　60/403
2015/0369262 A1 * 12/2015 Kubo .................... F15B 11/044
　　　　　　　　　　　　　　　　　　　　　　137/565.01

FOREIGN PATENT DOCUMENTS

| JP | 2542500 Y2 | 7/1997 |
| JP | 2009-063115 A | 3/2009 |
| JP | 2009204074 A | 9/2009 |

* cited by examiner

FLUID PRESSURE CONTROL DEVICE

TECHNICAL FIELD

The present invention relates to a fluid pressure control device that controls the operation of a hydraulic operating machine.

BACKGROUND ART

As a hydraulic control device that controls the operation of a hydraulic operating machine, JP2009-63115A discloses a device including a cylinder that extends/retracts by a working oil supplied from a pump to drive a load, a control valve that switches the supply/discharge of the working oil to/from the cylinder to control the extension/retraction operation of the cylinder, and a load-retaining mechanism that is interposed in a main passage that connects a load-side pressure chamber of the cylinder to the control valve.

The load-retaining mechanism includes an operated check valve and a meter-out control valve that operates by a pilot pressure to perform metering control and switches the operation of the operated check valve.

The switching position of the meter-out control valve is set when a spool moves by a balance between a biasing force of a spring and a thrust force of a piston operated by a pilot pressure. When the spool moves upon receiving a thrust force of the piston, the spool and piston enter a state in which their end surfaces are in contact with each other.

SUMMARY OF INVENTION

If the angularity of the end surfaces of the spool and piston that are in contact with each other is poor, or if the coaxiality between a sliding hole in which the spool slides and a sliding hole in which the piston slides is poor, when the spool moves upon receiving the thrust force of the piston, the piston may tilt causing increased sliding resistance on the sliding hole.

If the sliding resistance of the piston increases, the thrust force of the piston is not efficiently imparted to the spool, and the relationship between the pilot pressure and a flow amount of working oil passing through the meter-out control valve deviates from a planned value. In order to prevent such a deviation, a high level of working precision is necessary for the spool and the piston as well as the sliding holes in which they slide, and this results in increased manufacturing costs for the overall device.

An object of the present invention is to efficiently impart the thrust force of the piston to the spool.

According to one aspect of the present invention, a fluid pressure control device includes a cylinder that extends/retracts to drive a load by a working fluid supplied from a pump, a control valve that switches supply/discharge of the working fluid to/from the cylinder to control an extension/retraction operation of the cylinder, a pilot valve that pilot operates the control valve by a pilot pressure, a main passage that connects the control valve to a load-side pressure chamber of the cylinder on which a load pressure by the load acts when the control valve is in a blocked position, and a load-retaining mechanism that is interposed in the main passage and retains the load pressure of the load-side pressure chamber when the control valve is in the blocked position. The load-retaining mechanism includes an operated check valve that permits a flow of the working fluid from the control valve to the load-side pressure chamber while also permitting a flow of the working fluid from the load-side pressure chamber to the control valve according to a pressure of a back pressure chamber to which pressure of the load-side pressure chamber is constantly led via a restriction passage, and a switching valve that operates in conjunction with the control valve by a pilot pressure supplied via the pilot valve to switch an operation of the operated check valve. The switching valve includes a pilot chamber to which the pilot pressure is supplied via the pilot valve, a spool that moves according to the pilot pressure of the pilot chamber, and a piston that is accommodated in the pilot chamber and imparts a thrust force to the spool upon receiving the pilot pressure at its back surface. The piston includes a first piston that is slidingly accommodated in the pilot chamber and is acted upon by the pilot pressure at its back surface, and a second piston whose distal end faces an end surface of the spool and is inserted coaxially with the first piston into an accommodating hole formed in the first piston, and wherein a spherical protrusion is provided on a center of either one of a bottom surface of the accommodating hole of the first piston and a back surface of the second piston.

Embodiments of the present invention and advantages thereof are described in detail below with reference to the accompanying drawings.

DESCRIPTION OF EMBODIMENTS

Figure 1:
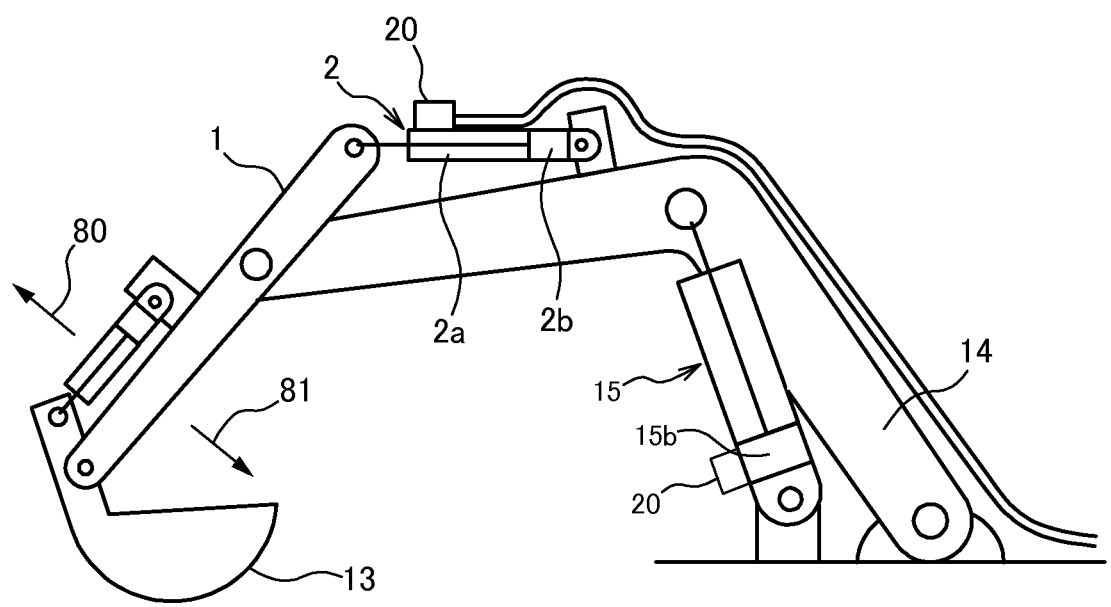
FIG. 1 is a view illustrating a portion of a hydraulic shovel.

A fluid pressure control device of an embodiment of the present invention will now be explained referring to the drawings.

The fluid pressure control device is a hydraulic control device that controls the operation of a hydraulic operating machine such as a hydraulic shovel. In the present embodiment, the fluid pressure control device controls an extension/ retraction operation of a cylinder 2 that drives an arm (load) 1 of the hydraulic shovel shown in FIG. 1.

Figure 2:
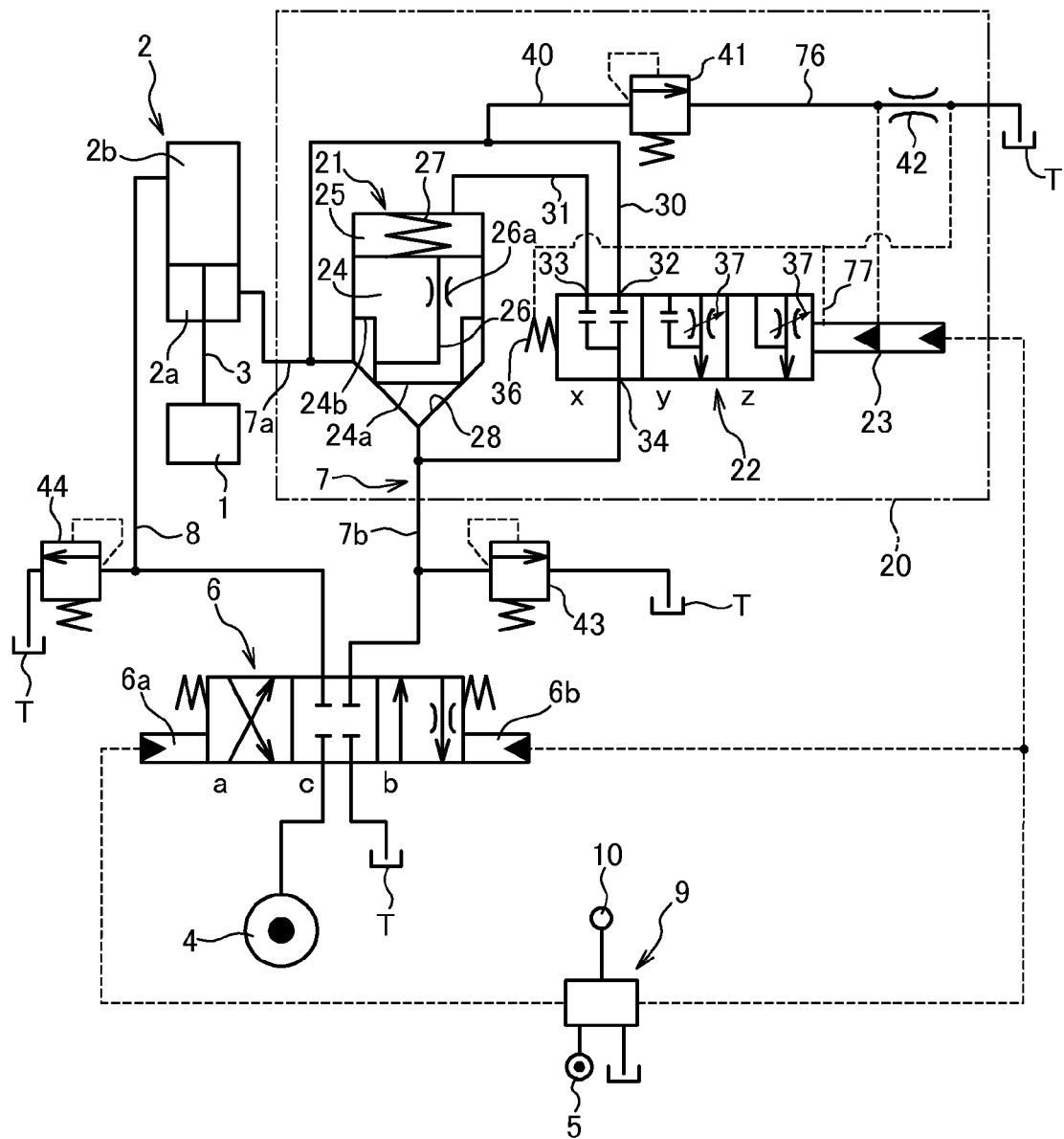
FIG. 2 is a hydraulic circuit diagram of a fluid pressure control device of an embodiment of the present invention.

First, a hydraulic circuit of the hydraulic control device will be explained referring to FIG. 2. FIG. 2 is a hydraulic circuit diagram of the hydraulic control device.

The cylinder 2 is partitioned into a rod-side pressure chamber 2a and a non-rod-side pressure chamber 2b by a piston rod 3 that slidingly moves within the cylinder 2.

An engine is installed in the hydraulic shovel, and a pump 4 which serves as a hydraulic source and a pilot pump 5 are connected to the engine.

Working oil (working fluid) that is discharged from the pump 4 is supplied to the cylinder 2 through a control valve 6.

The control valve 6 and the rod-side pressure chamber 2a of the cylinder 2 are connected by a first main passage 7, and the control valve 6 and the non-rod-side pressure chamber 2b of the cylinder 2 are connected by a second main passage 8.

The control valve 6 is operated by a pilot pressure supplied to pilot chambers 6a and 6b through a pilot valve 9 from the pilot pump 5 in accordance with the manual operation of an operation lever 10 by a crew member of the hydraulic shovel.

Specifically, when a pilot pressure is supplied to the pilot chamber 6a, the control valve 6 switches to a position "a", and working oil is supplied from the pump 4 to the rod-side pressure chamber 2a through the first main passage 7 and working oil of the non-rod-side pressure chamber 2b is discharged to a tank T through the second main passage 8. Thereby, the cylinder 2 retracts and the arm 1 rises in the direction of an arrow mark 80 shown in FIG. 1.

On the other hand, when a pilot pressure is supplied to the pilot chamber 6b, the control valve 6 switches to a position "b", and working oil is supplied from the pump 4 to the non-rod-side pressure chamber 2b through the second main passage 8 and working oil of the rod-side pressure chamber 2a is discharged to the tank T through the first main passage 7. Thereby, the cylinder 2 extends and the arm 1 lowers in the direction of an arrow mark 81 shown in FIG. 1.

When a pilot pressure is not supplied to the pilot chambers 6a and 6b, the control valve 6 switches to a position "c", and the supply/discharge of working oil to/from the cylinder 2 is blocked. Thus, the arm 1 is maintained in a stopped state.

In this way, the control valve 6 has three switching positions consisting of the retracting position "a" in which the cylinder 2 is retracted, the extending position "b" in which the cylinder 2 is extended, and the blocked position "c" in which the load of the cylinder 2 is retained. The supply/discharge of working oil to/from the cylinder 2 is switched to control the extension/retraction operation of the cylinder 2.

Herein, as shown in FIG. 1, if the control valve 6 is switched to the blocked position "c" to stop the movement of the arm 1 in a state in which the bucket 13 is lifted up, a force in an extension direction acts on the cylinder 2 due to the weight of the bucket 13, the arm 1, and the like. Thus, in the cylinder 2 that drives the arm 1, the rod-side pressure chamber 2a becomes a load-side pressure chamber upon which a load pressure acts when the control valve 6 is in the blocked position "c". Therein, lowering of the load refers to movement in a direction in which the load-side pressure chamber contracts, and raising of the load refers to movement in a direction in which the load-side pressure chamber expands.

A load-retaining mechanism 20 is interposed in the first main passage 7 that is connected to the rod-side pressure chamber 2a which is on the load side. The load-retaining mechanism 20 retains the load pressure of the rod-side pressure chamber 2a when the control valve 6 is in the blocked position "c", and is fixed to the surface of the cylinder 2 as shown in FIG. 1.

In a cylinder 15 that drives a boom 14, a non-rod-side pressure chamber 15b becomes the load-side pressure chamber. Thus, if the load-retaining mechanism 20 is provided on the boom 14, the load-retaining mechanism 20 is interposed in a main passage that is connected to the non-rod-side pressure chamber 15b (refer to FIG. 1).

The load-retaining mechanism 20 includes an operated check valve 21 that is interposed in the first main passage 7, and a meter-out control valve 22 that serves as a switching valve which operates in conjunction with the control valve 6 by a pilot pressure supplied to a pilot chamber 23 through a pilot valve 9 to switch the operation of the operated check valve 21.

The operated check valve 21 includes a valve body 24 that opens/closes the first main passage 7, a seat part 28 on which the valve body 24 sits, a back pressure chamber 25 that is defined on a back surface of the valve body 24, and a restriction passage 26 that is formed in the valve body 24 and constantly leads working oil of the rod-side pressure chamber 2a to the back pressure chamber 25. A restriction 26a is interposed in the restriction passage 26.

The first main passage 7 is divided into a cylinder-side first main passage 7a and a control valve-side first main passage 7b by the valve body 24. The cylinder-side first main passage 7a connects the rod-side pressure chamber 2a and the operated check valve 21, and the control valve-side first main passage 7b connects the operated check valve 21 and the control valve 6.

In the valve body 24, a first pressure-bearing surface 24a on which pressure of the control valve-side first main passage 7b acts and a second pressure-bearing surface 24b on which pressure of the rod-side pressure chamber 2a acts through the cylinder-side first main passage 7a are formed.

A spring 27 that serves as a biasing member which biases the valve body 24 in a valve-closing direction is accommodated in the back pressure chamber 25. In this way, the pressure of the back pressure chamber 25 and the biasing force of the spring 27 act in a direction to make the valve body 24 sit on the seat part 28.

In the state in which the valve body 24 sits on the seat part 28, the operated check valve 21 exhibits a function as a check valve that blocks the flow of working oil from the rod-side pressure chamber 2a to the control valve 6. In other words, the operated check valve 21 prevents leakage of the working oil within the rod-side pressure chamber 2a to retain the load pressure and retain the stopped state of the arm 1.

The load-retaining mechanism 20 includes a bypass passage 30 which bypasses the operated check valve 21 to lead working oil of the rod-side pressure chamber 2a to the control valve-side first main passage 7b, and a back pressure passage 31 that leads working oil of the back pressure chamber 25 to the control valve-side first main passage 7b.

The meter-out control valve 22 is interposed in the bypass passage 30 and the back pressure passage 31, and switches communication of the control valve-side first main passage 7b with the bypass passage 30 and the back pressure passage 31 to control the flow of working oil of the first main passage 7 which is on the meter-out side when the cylinder 2 is operated to extend.

The meter-out control valve 22 includes the following three ports: a first supply port 32 that communicates with the bypass passage 30, a second supply port 33 that communicates with the back pressure passage 31, and a discharge port 34 that communicates with the control valve-side first main passage 7b.

The meter-out control valve 22 includes the following three switching positions: a blocked position "x", a first communication position "y", and a second communication position "z".

When a pilot pressure is supplied to the pilot chamber 6b of the control valve 6, a pilot pressure of the same pressure is simultaneously supplied to the pilot chamber 23. In other words, when the control valve 6 is switched to the extending position "b", the meter-out control valve 22 is also switched to the first communication position "y" or the second communication position "z".

In more detail, if a pilot pressure is not supplied to the pilot chamber 23, the meter-out control valve 22 is maintained in the blocked position "x" by a biasing force of a spring 36. In the blocked position "x", both of the first supply port 32 and the second supply port 33 are blocked.

If a pilot pressure that is less than a predetermined pressure is supplied to the pilot chamber 23, the meter-out control valve 22 switches to the first communication position "y". In the first communication position "y", the first supply port 32 communicates with the discharge port 34. Thereby, working oil of the rod-side pressure chamber 2a is led from the bypass passage 30 to the control valve-side first main passage 7b through the meter-out control valve 22. At this time, resistance is applied to the flow of working oil by restrictions 37. The second supply port 33 is maintained in a blocked state.

If a pilot pressure that is equal to or greater than a predetermined pressure is supplied to the pilot chamber 23, the meter-out control valve 22 switches to the second communication position "z". In the second communication position "z", the first supply port 32 communicates with the discharge port 34 and the second supply port 33 also communicates with the discharge port 34. Thereby, working oil of the back pressure chamber 25 is led from the back pressure passage 31 to the control valve-side first main passage 7b through the meter-out control valve 22.

A relief passage 40 is connected in a branching manner to the bypass passage 30 upstream of the meter-out control valve 22. A relief valve 41 that opens when the pressure of the rod-side pressure chamber 2a reaches a predetermined pressure to allow the passage of working oil and release working oil of the rod-side pressure chamber 2a is interposed in the relief passage 40. Working oil that has passed through the relief valve 41 is discharged to the tank T through a discharge passage 76. An orifice 42 is interposed in the discharge passage 76, and pressure on the upstream side of the orifice 42 is led to the pilot chamber 23. In this way, working oil that has passed through the relief valve 41 is led to the pilot chamber 23, and the meter-out control valve 22 is set to be switched by this pressure to the first communication position "y" or the second communication position "z".

A first main relief valve 43 is connected to the control valve-side first main passage 7b, and a second main relief valve 44 is connected to the second main passage 8. The first main relief valve 43 and the second main relief valve 44 are for the purpose of relieving the high pressure that is generated in the rod-side pressure chamber 2a and the non-rod-side pressure chamber 2b of the cylinder 2 when a large external force acts on the arm 1.

Figure 3:
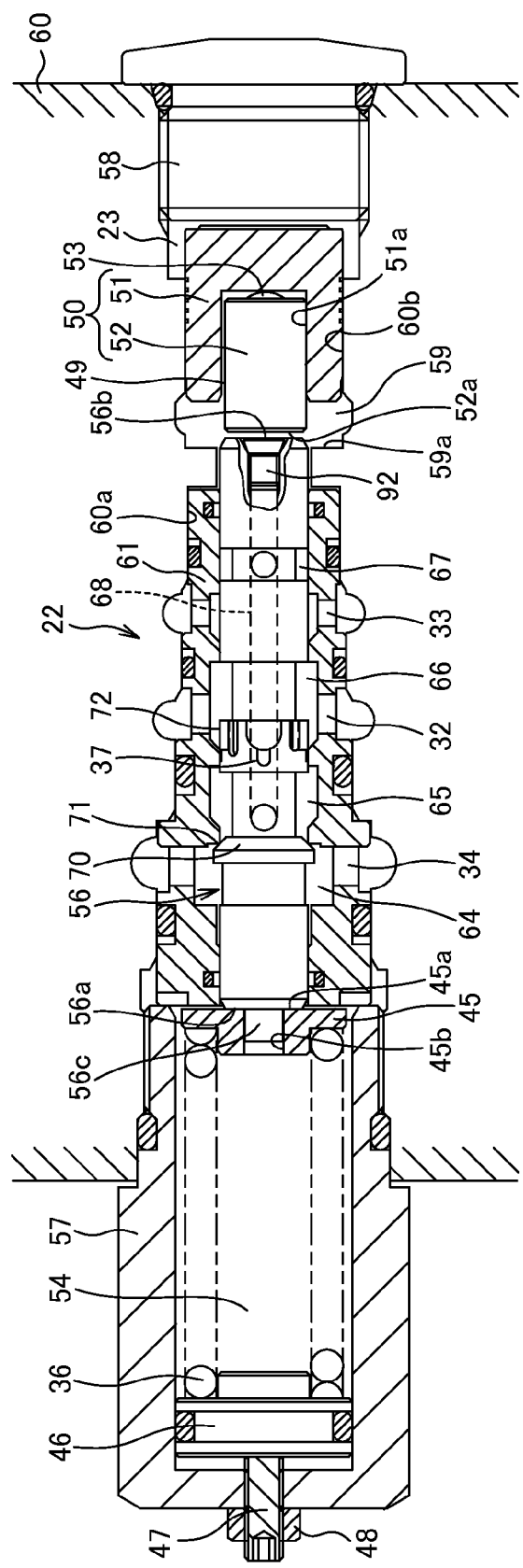
FIG. 3 is a cross-section view of a meter-out control valve in the fluid pressure control device of the embodiment of the present invention, and illustrates a state in which a pilot pressure does not act on a pilot chamber.

Next, referring mainly to FIG. 3, the meter-out control valve 22 will be explained in detail. FIG. 3 is a cross-section view of the meter-out control valve 22, and illustrates a state in which a pilot pressure does not act on the pilot chamber. In FIG. 3, members that are assigned the same reference numerals as used in FIG. 2 indicate the same members as shown in FIG. 2.

The meter-out control valve 22 is incorporated in a body 60. A spool hole 60a is formed in the body 60, and a substantially cylindrical sleeve 61 is inserted into the inner periphery of the spool hole 60a. A spool 56 is slidably incorporated into the inner periphery of the sleeve 61.

A spring chamber 54 that is compartmentalized by a cap 57 is defined at the side of a first end surface 56a of the spool 56. The spring chamber 54 communicates with the tank T via a passage (not illustrated). A spring 36 that serves as a biasing member which biases the first end surface 56a of the spool 56 is accommodated in the spring chamber 54. Further, an annular-shaped first spring receiving member 45 and a second spring receiving member 46 are also accommodated in the spring chamber 54. An end surface 45a of the first spring receiving member 45 abuts the first end surface 56a of the spool 56, and a pin part 56c formed to protrude at the first end surface 56a of the spool 56 is inserted into a hollow part 45b of the first spring receiving member 45. The second spring receiving member 46 is disposed near the bottom of the cap 57. The spring 36 is interposed in a compressed state between the first spring receiving member 45 and the second spring receiving member 46 so as to bias the spool 56 via the first spring receiving member 45.

An axial direction position of the second spring receiving member 46 within the spring chamber 54 is set by abutting a distal end of an adjusting bolt 47 that is threaded to penetrate into the bottom of the cap 57 to a back surface of the second spring receiving member 46. By screwing the adjusting bolt 47, the second spring receiving member 46 moves in a direction approaching the first spring receiving member 45. Thus, by adjusting the amount that the adjusting bolt 47 is screwed, the biasing force of the spring 36 can be adjusted. The adjusting bolt 47 is fixed to a nut 48.

The pilot chamber 23 is defined at the side of a second end surface 56b of the spool 56 by a piston hole 60b formed to communicate with the spool hole 60a and a cap 58 that blocks the piston hole 60b. A pilot pressure is supplied to the pilot chamber 23 through a through-hole (not illustrated) formed in the cap 58.

A piston 50 that receives the pilot pressure at its back surface and imparts a thrust force to the spool 56 is accommodated in the pilot chamber 23. The piston 50 includes a closed-end cylindrical first piston 51 and a circular column-shaped second piston 52. The first piston 51 is slidably accommodated in the pilot chamber 23, and the pilot pressure acts on the back surface of the first piston 51. A distal end surface 52a of the second piston 52 faces the second end surface 56b of the spool 56, and the second piston 52 is inserted into an accommodating hole 51a formed in the first piston 51. In this way, the piston 50 is constituted by dividing it into the first piston 51 and the second piston 52. The first piston 51 and the second piston 52 are disposed substantially coaxially.

A spherical protrusion 53 is provided at a center portion of the back surface of the second piston 52. When a pilot pressure acts on the back surface of the first piston 51, the first piston 51 slides along an inner peripheral surface of the piston hole 60b and abuts the second piston 52 via the protrusion 53. The second piston 52 is pushed forward by the first piston 51 so that its distal end surface 52a abuts the second end surface 56b of the spool 56 to move the spool 56. In this way, the spool 56 moves upon receiving a thrust force from the second piston 52 that is generated based on the pilot pressure that acts on the back surface of the first piston 51.

A drain chamber 59 is defined at a distal end side of the piston 50, or in other words at the opposite side of the pilot chamber 23 with the piston 50 therebetween. The drain chamber 59 is connected to the tank T via communication with a downstream side of the orifice 42 in the relief passage 40 through a drain passage 77 (refer to FIG. 2). In this way, the back surface of the piston 50 faces the pilot chamber 23 and the distal end surface of the piston 50 faces the drain chamber 59, and thus the thrust force of the piston 50 that is generated based on the pilot pressure of the pilot chamber 23 is efficiently imparted to the spool 56.

The spool 56 stops at a position at which the biasing force of the spring 36 that acts on the first end surface 56a and the thrust force of the piston 50 that acts on the second end surface 56b reach a balance, and the switching position of the meter-out control valve 22 is set at this stopped position of the spool 56.

The following three ports are formed in the sleeve 61: the first supply port 32 that communicates with the bypass passage 30 (refer to FIG. 2), the second supply port 33 that communicates with the back pressure passage 31 (refer to FIG. 2), and the discharge port 34 that communicates with the control valve-side first main passage 7b.

An outer peripheral surface of the spool 56 is partially notched in an annular shape, and a first pressure chamber 64, a second pressure chamber 65, a third pressure chamber 66, and a fourth pressure chamber 67 are formed by these notched portions and an inner peripheral surface of the sleeve 61.

The first pressure chamber 64 is in constant communication with the discharge port 34.

The third pressure chamber 66 is in constant communication with the first supply port 32. On the outer periphery of a land part 72 of the spool 56, a plurality of restrictions 37 that enable communication between the third pressure chamber 66 and the second pressure chamber 65 when the spool 56 moves against the biasing force of the spring 36 are formed.

The fourth pressure chamber 67 is in constant communication with the second pressure chamber 65 via a pressure-introducing passage 68 that is formed in the axial direction in the spool 56.

When a pilot pressure is not supplied to the pilot chamber 23, a poppet valve 70 formed on the spool 56 is pressed against a valve seat 71 formed on an inner periphery of the sleeve 61 by the biasing force of the spring 36, and communication between the second pressure chamber 65 and the first pressure chamber 64 is blocked. Accordingly, communication between the first supply port 32 and the discharge port 34 is blocked. Thereby, working oil of the rod-side pressure chamber 2a does not leak to the discharge port 34. This state corresponds to the blocked position "x" of the meter-out control valve 22. In a state in which the poppet valve 70 is seated on the valve seat 71 by the biasing force of the spring 36, a slight gap exists between the end surface 45a of the first spring receiving member 45 and the end surface of the sleeve 61. Thus, the poppet valve 70 is reliably seated on the valve seat 71 by the biasing force of the spring 36.

When a pilot pressure is supplied to the pilot chamber 23 and the thrust force of the piston 50 that acts on the spool 56 becomes larger than the biasing force of the spring 36, the spool 56 moves against the biasing force of the spring 36. Thereby, the poppet valve 70 separates from the valve seat 71, and communication is enabled between the third pressure chamber 66 and the second pressure chamber 65 via the plurality of restrictions 37. Therefore, the first supply port 32 communicates with the discharge port 34 via the third pressure chamber 66, the second pressure chamber 65, and the first pressure chamber 64. Due to the communication between the first supply port 32 and the discharge port 34, working oil of the rod-side pressure chamber 2a is led to the control valve-side first main passage 7b via the restrictions 37. This state corresponds to the first communication position "y" of the meter-out control valve 22.

If the pilot pressure supplied to the pilot chamber 23 increases, the spool 56 moves further against the biasing force of the spring 36, and the fourth pressure chamber 67 communicates with the second supply port 33. Thereby, the second supply port 33 communicates with the discharge port 34 via the fourth pressure chamber 67, the pressure-introducing passage 68, the second pressure chamber 65, and the first pressure chamber 64. Due to the communication between the second supply port 33 and the discharge port 34, working oil of the back pressure chamber 25 is led to the control valve-side first main passage 7b. This state corresponds to the second communication position "z" of the meter-out control valve 22.

Next, the operation of the hydraulic control device will be explained referring mainly to FIGS. 2 and 3.

When the control valve 6 is in the blocked position "c", working oil discharged from the pump 4 is not supplied to the cylinder 2. At this time, since a pilot pressure is not supplied to the pilot chamber 23 of the meter-out control valve 22, the meter-out control valve 22 is also in the blocked position "x".

Therefore, the back pressure chamber 25 of the operated check valve 21 is maintained at the pressure of the rod-side pressure chamber 2a. Herein, a pressure-bearing surface area in the valve-closing direction of the valve body 24 (the surface area of the back surface of the valve body 24) is larger than the surface area of the second pressure-bearing surface 24b which is the pressure-bearing surface area in the valve-opening direction. Thus, the valve body 24 is in a state in which it is seated on the seat part 28 by the pressure of the back pressure chamber 25 and the biasing force of the spring 27. In this way, leakage of the working oil within the rod-side pressure chamber 2a is prevented by the operated check valve 21, and the arm 1 is retained in a stopped state.

If the operation lever 10 is operated so that a pilot pressure is supplied from the pilot valve 9 to the pilot chamber 6a of the control valve 6, the control valve 6 switches to the retracting position "a" by only an amount corresponding to the pilot pressure. When the control valve 6 switches to the retracting position "a", the pressure of working oil discharged from the pump 4 acts on the first pressure-bearing surface 24a of the operated check valve 21. At this time, the meter-out control valve 22 is in the blocked position "x" because a pilot pressure is not supplied to the pilot chamber 23, and thus the back pressure chamber 25 of the operated check valve 21 is maintained at the pressure of the rod-side pressure chamber 2a. If the load acting on the first pressure-bearing surface 24a becomes larger than the total load of the load acting on the back surface of the valve body 24 by the pressure of the back pressure chamber 25 and the biasing force of the spring 27, the valve body 24 separates from the seat part 28. In this way, when the operated check valve 21 opens, working oil discharged from the pump 4 is supplied to the rod-side pressure chamber 2a and the cylinder 2 retracts. Thereby, the arm 1 rises in a direction of the arrow mark 80 shown in FIG. 1.

If the operation lever 10 is operated so that a pilot pressure is supplied from the pilot valve 9 to the pilot chamber 6b of the control valve 6, the control valve 6 switches to the extending position "b" by only an amount corresponding to the pilot pressure. At the same time, a pilot pressure is also supplied to the pilot chamber 23, and thus the meter-out control valve 22 switches to the first communication position "y" or the second communication position "z" according to the pilot pressure that is supplied.

If the pilot pressure supplied to the pilot chamber 23 is less than a predetermined pressure, the meter-out control valve 22 switches to the first communication position "y". In this case, communication between the second supply port 33 and the discharge port 34 is blocked, and thus the back pressure chamber 25 of the operated check valve 21 is maintained at the pressure of the rod-side pressure chamber 2a and the operated check valve 21 is in a closed state.

On the other hand, since the first supply port 32 is in communication with the discharge port 34, working oil of the rod-side pressure chamber 2a passes from the bypass passage 30 through the restrictions 37 and is led to the control valve-side first main passage 7b and then discharged from the control valve 6 to the tank T. Also, since working oil discharged from the pump 4 is supplied to the non-rod-side pressure chamber 2b, the cylinder 2 extends, and thereby the arm 1 lowers in the direction of the arrow mark 81 shown in FIG. 1.

Herein, the meter-out control valve 22 is switched to the first communication position "y" mainly in the case of executing a crane operation in which an item to be transported attached to the bucket 13 is unloaded at a target location. In this crane operation, it is necessary to make the cylinder 2 extend at a low speed to lower the arm 1 slowly in the direction of the arrow mark 81. Thus, the control valve 6 is switched only slightly toward the extending position "b". Therefore, the pressure that is supplied into the pilot chamber 6b of the control valve 6 is small, and the pilot pressure that is supplied into the pilot chamber 23 of the meter-out control valve 22 is less than a predetermined pressure, such that the meter-out control valve 22 is only switched up to the first communication position "y". Accordingly, working oil of the rod-side pressure chamber 2a is discharged upon passing through the restrictions 37, and the arm 1 lowers at a low speed suitable for the crane operation.

When the meter-out control valve 22 is in the first communication position "y", the flow amount of working oil discharged from the rod-side pressure chamber 2a is restricted by the restrictions 37 even if a situation such as leakage of working oil to the outside due to a rupture in the control valve-side first main passage 7b or the like occurs. Therefore, the falling speed of the bucket 13 does not increase. This function is called metering control. Before the bucket 13 falls to the ground, the meter-out control valve 22 can be switched to the blocked position "x", and thus the bucket 13 can be prevented from falling.

In this way, the restrictions 37 are for the purpose of suppressing the lowering speed of the cylinder 2 when the operated check valve 21 is closed, and suppressing the falling speed of the bucket 13 when there is a rupture in the control valve-side first main passage 7b.

If the pilot pressure supplied to the pilot chamber 23 is equal to or greater than a predetermined pressure, the meter-out control valve 22 switches to the second communication position "z". In this case, since the second supply port 33 is in communication with the discharge port 34, working oil of the back pressure chamber 25 of the operated check valve 21 is led from the back pressure passage 31 to the control valve-side first main passage 7b and then discharged from the control valve 6 to the tank T. Thereby, since a differential pressure occurs before/after the restriction passage 26 and the pressure within the back pressure chamber 25 is small, the force in the valve-closing direction that acts on the valve body 24 decreases. Thus, the valve body 24 separates from the seat part 28 and the function of the operated check valve 21 as a check valve is cancelled.

In this way, the operated check valve 21 operates to permit the flow of working oil from the control valve 6 to the rod-side pressure chamber 2a, while also permitting the flow of working oil from the rod-side pressure chamber 2a to the control valve 6 according to the pressure of the back pressure chamber 25.

If the operated check valve 21 opens, working oil of the rod-side pressure chamber 2a passes through the first main passage 7 and then is discharged to the tank T, and thus the cylinder 2 extends quickly. In other words, if the meter-out control valve 22 is switched to the second communication position "z", the flow amount of working oil discharged from the rod-side pressure chamber 2a increases, and thus the flow amount of working oil that is supplied to the non-rod-side pressure chamber 2b also increases and the extending speed of the cylinder 2 increases. Thereby, the arm 1 lowers quickly in the direction of the arrow mark 81.

The meter-out control valve 22 is switched to the second communication position "z" in the case of executing an excavating operation and the like, and the control valve 6 is switched considerably toward the extending position "b". Therefore the pressure that is supplied to the pilot chamber 6b of the control valve 6 is large, and the pilot pressure that is supplied to the pilot chamber 23 of the meter-out control valve 22 is equal to or greater than a predetermined pressure. Thus, the meter-out control valve 22 is switched up to the second communication position "z".

When the control valve 6 is set to the blocked position "c" and the movement of the arm 1 is stopped, if a large external force is applied to the arm 1, the pressure of the rod-side pressure chamber 2a or the non-rod-side pressure chamber 2b of the cylinder 2 rises. If the pressure of the rod-side pressure chamber 2a reaches a predetermined pressure, the relief valve 41 operates to open, and working oil of the rod-side pressure chamber 2a is discharged via the orifice 42. Pressure on the upstream side of the orifice 42 is led to the pilot chamber 23 of the meter-out control valve 22, and thus the spool 56 receives a thrust force from the piston 50 and moves in a direction to compress the spring 36. Thereby, the meter-out control valve 22 switches to the first communication position "y" or the second communication position "z", and communication is enabled between the cylinder-side first main passage 7a and the control valve-side first main passage 7b. Due to this communication, high pressure of the rod-side pressure chamber 2a is discharged to the tank T through the first main relief valve 43.

Further, if the pressure of the non-rod-side pressure chamber 2b reaches a predetermined pressure, the second main relief valve 44 operates to open, and high pressure of the non-rod-side pressure chamber 2b is discharged to the tank T through the second main relief valve 44.

Figure 4:
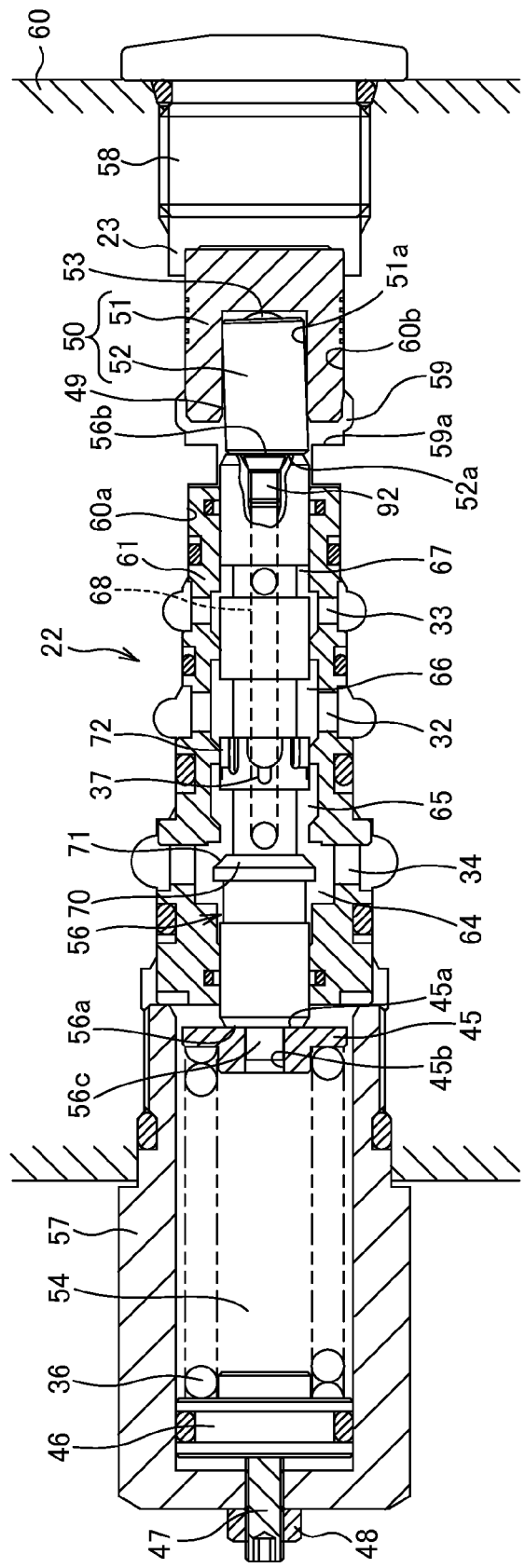
FIG. 4 is a cross-section view of the meter-out control valve in the fluid pressure control device of the embodiment of the present invention, and illustrates a state in which a pilot pressure acts on the pilot chamber and a spool is in the middle of a stroke.
Figure 5:
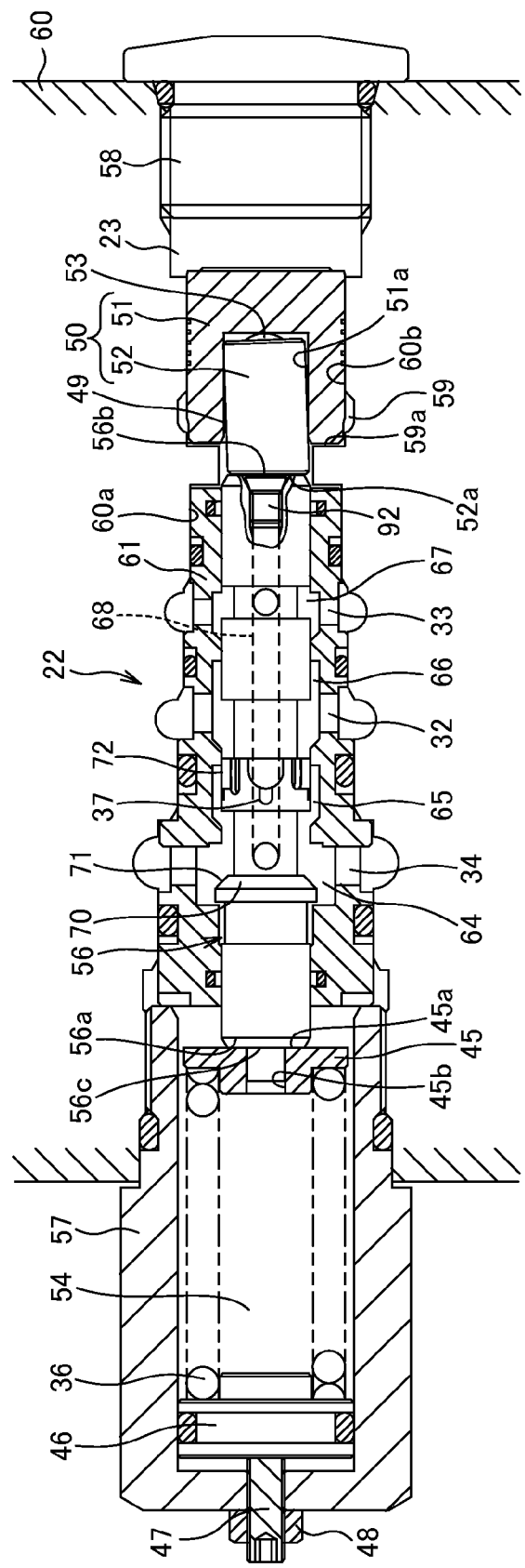
FIG. 5 is a cross-section view of the meter-out control valve in the fluid pressure control device of the embodiment of the present invention, and illustrates a state in which a pilot pressure acts on the pilot chamber and the spool has performed a full stroke.
Figure 6:
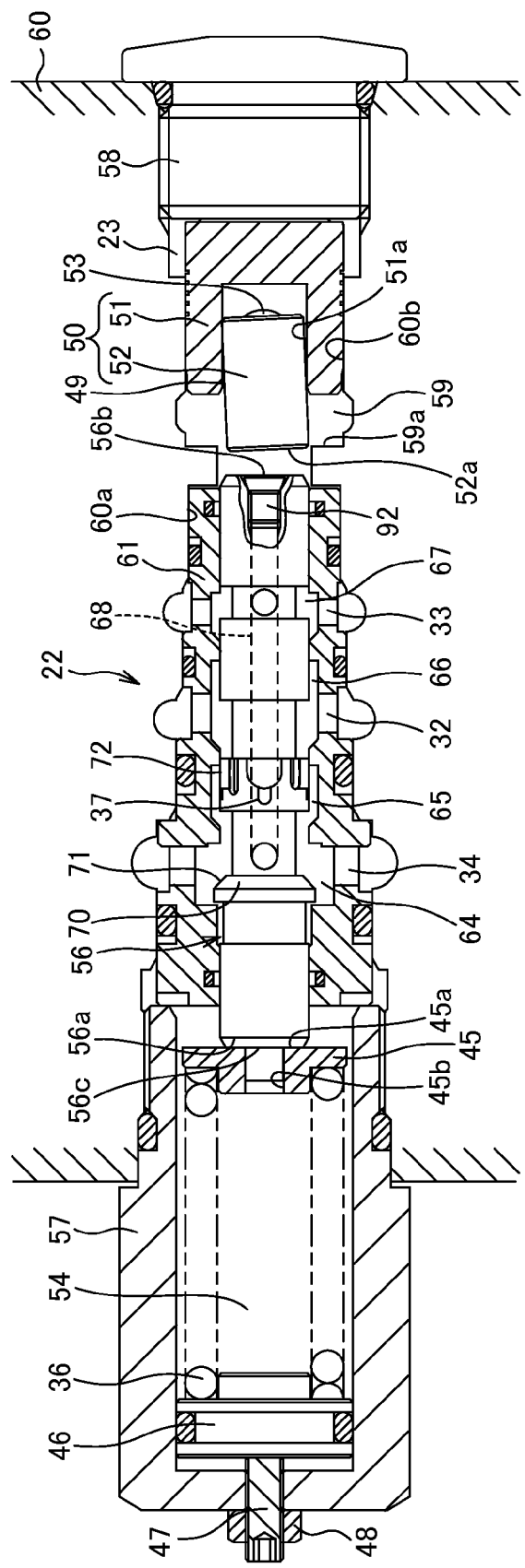
FIG. 6 is a cross-section view of the meter-out control valve in the fluid pressure control device of the embodiment of the present invention, and illustrates a state in which a second piston is coming out of a first piston.
Figure 7:
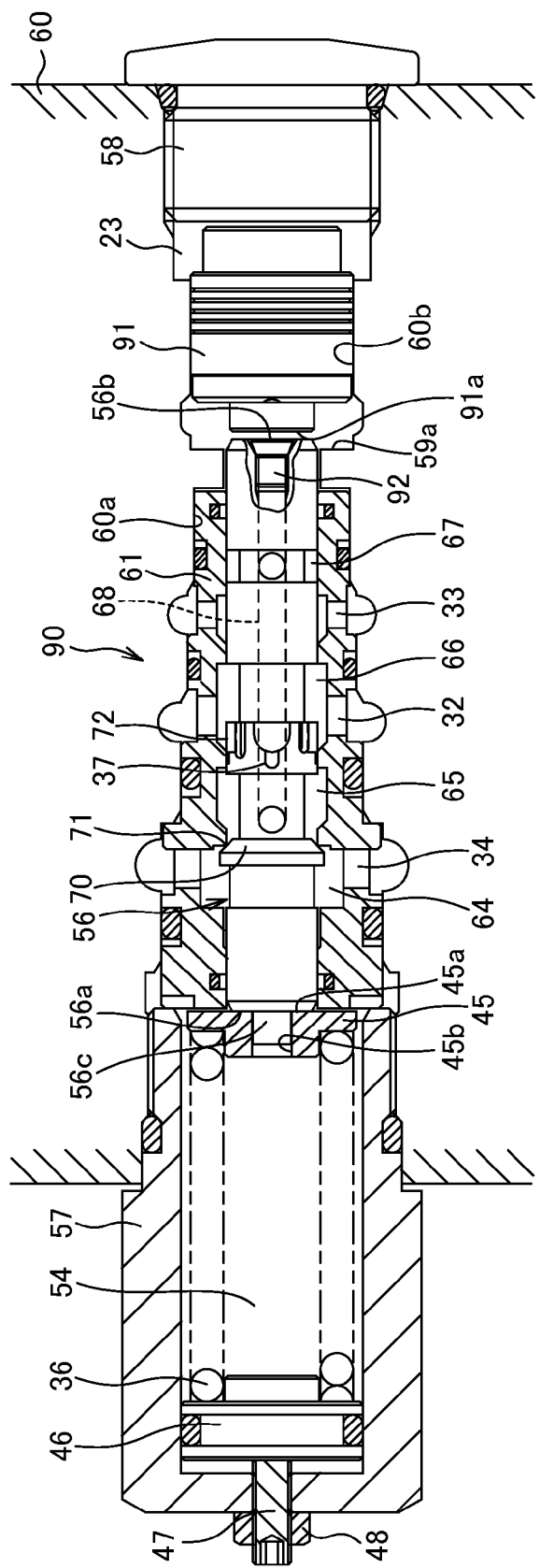
FIG. 7 is a cross-section view of a meter-out control valve of a comparative example.
Figure 8:
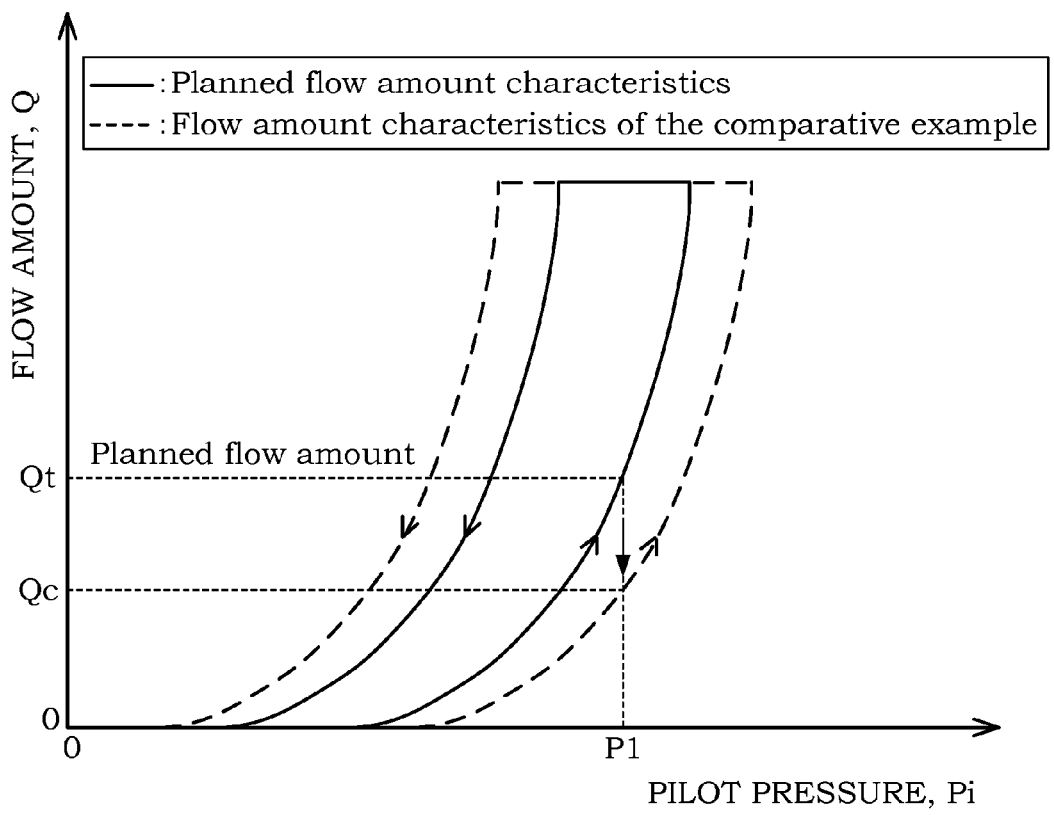
FIG. 8 is a graph illustrating a relationship between a pilot pressure of the pilot chamber and a flow amount passing through a poppet valve of the spool of the meter-out control valve, in which the solid lines indicate planned flow amount characteristics and the dashed lines indicate flow amount characteristics of the comparative example.

Next, the operation of the piston 50 will be explained in detail referring to FIGS. 3 to 6. FIGS. 3 to 6 are cross-section views of the meter-out control valve 22. FIG. 3 illustrates a state in which a pilot pressure does not act on the pilot chamber 23, FIG. 4 illustrates a state in which a pilot pressure acts on the pilot chamber 23 and the spool 56 is in the middle of a stroke, FIG. 5 illustrates a state in which a pilot pressure acts on the pilot chamber 23 and the spool 56 has performed a full stroke, and FIG. 6 illustrates a state in which the second piston 52 is coming out of the first piston 51. FIG. 7 is a cross-section view of a meter-out control valve 90 of a comparative example, and FIG. 8 is a graph illustrating a relationship between a pilot pressure Pi of the pilot chamber 23 and a flow amount Q passing through the poppet valve 70 of the spool 56. In FIG. 8, the solid lines indicate the planned flow amount characteristics and the dashed lines indicate the flow amount characteristics of the comparative example shown in FIG. 7.

As shown by the solid lines in FIG. 8, in the flow amount characteristics of the flow amount Q relative to the pilot pressure Pi, there are predetermined planned (target) flow amount characteristics, and hysteresis exists between times of increasing flow amount and times of decreasing flow amount. When assembling the meter-out control valve 22, adjustments are made so that the planned flow rate characteristics are obtained. Specifically, by adjusting the amount that the adjusting bolt 47 is screwed to adjust the biasing force of the spring 36, the actual flow amount characteristics are adjusted to match the planned flow amount characteristics.

Herein, the comparative example shown in FIG. 7 will now be explained. In the comparative example, a thrust force is imparted to the spool 56 using a single piston 91 that is slidingly accommodated in the pilot chamber 23. If the angularity between the second end surface 56b of the spool 56 and a distal end surface 91a of the piston 91 which contact each other is poor, the piston 91 may tilt when the spool 56 moves upon receiving the thrust force of the piston 91, which causes an increase in the sliding resistance on the piston hole 60b. Also, since the piston 91 can freely rotate on the axial center within the piston hole 60b, the sliding resistance changes in accordance with this rotation. Further, if the coaxiality between the inner periphery of the sleeve 61 in which the spool 56 slides and the piston hole 60b in which the piston 91 slides is poor, the sliding resistance of the piston 91 on the piston hole 60b may increase when the spool 56 moves upon receiving the thrust force of the piston 91 even if the angularity between the second end surface 56b of the spool 56 and the distal end surface 91a of the piston 91 is not poor.

If the sliding resistance of the piston 91 increases, it may become difficult for the piston 91 to move smoothly within the pilot chamber 23, and thus the thrust force of the piston 91 will not be efficiently imparted to the spool 56. Therefore, as shown by the dashed lines in FIG. 8, the actual flow amount characteristics deviate from the planned flow amount characteristics. Referring to FIG. 8, more specifically, when the pilot pressure is P1, the planned flow amount is Qt, but the flow amount decreases to Qc if the sliding resistance of the piston 91 increases. In this way, if the sliding resistance of the piston 91 increases, the planned flow amount cannot be obtained, and the hysteresis increases.

As a means for overcoming the above problem, in the present embodiment, the piston 50 includes the first piston 51 that is slidingly accommodated in the pilot chamber 23 and the second piston 52 that is inserted into the accommodating hole 51a of the first piston 51, and the spherical protrusion 53 is provided at a center portion of the back surface of the second piston 52. Further, as shown in FIG. 3, a gap 49 is formed between the inner peripheral surface of the accommodating hole 51a of the first piston 51 and the outer peripheral surface of the second piston 52.

If the angularity between the second end surface 56b of the spool 56 and the distal end surface 52a of the second piston 52 which contact each other is poor, as shown in FIG. 4, when the distal end surface 52a of the second piston 52 contacts the second surface 56b of the spool 56 and the thrust force of the second piston 52 is imparted to the spool 56, the second piston 52 can tilt within the accommodating hole 51a due to the existence of the gap 49. Further, the first piston 51 and the second piston 52 abut each other via the spherical protrusion 53, and thus the first piston 51 can receive a counterforce from the spool 56 at its center even if the second piston 52 is tilted within the accommodating hole 51a. Therefore, since the first piston 51 slides along the piston hole 60b without tilting, the sliding resistance on the piston hole 60b does not increase and the first piston 51 can move smoothly within the pilot chamber 23. In this way, even if the angularity between the second end surface 56b of the spool 56 and the distal end surface 52a of the second piston 52 which contact each other is poor, the thrust force of the piston 50 is efficiently imparted to the spool 56. As shown in FIG. 5, in the piston 50, the end surface of the first piston 51 abuts the end surface 59a of the drain chamber 59, and thus any further movement beyond that point is restricted.

Also, even if the coaxiality between the inner periphery of the sleeve 61 in which the spool 56 slides and the piston hole 60b in which the piston 50 slides is poor, the second piston 52 can tilt within the accommodating hole 51a due to the existence of the gap 49 and the first piston 51 can receive the counterforce from the spool 56 at its center. Therefore, the sliding resistance of the first piston 51 on the piston hole 60b does not increase, and thus the thrust force of the piston 50 is efficiently imparted to the spool 56.

Herein, if the second piston 52 cannot tilt within the accommodating hole 51a, then the tilt of the second piston 52 would be transferred to the first piston 51 and the sliding resistance of the first piston 51 on the piston hole 60b would increase. In other words, the same situation as that shown in FIG. 7 would arise. Therefore, the gap 49 between the inner peripheral surface of the accommodating hole 51a of the first piston 51 and the outer peripheral surface of the second piston 52 must be set to dimensions that enable the second piston 52 to tilt within the accommodating hole 51a. In other words, the gap 49 must be set to dimensions that permit tilting of the second piston 52 caused by working precision of the angularity between the second end surface 56b of the spool 56 and the distal end surface 52a of the second piston 52 which contact each other or the working precision of the coaxiality between the inner periphery of the sleeve 61 in which the spool 56 slides and the piston hole 60b in which the piston 50 slides. However, if the gap 49 is too large, the tilt of the second piston 52 within the accommodating hole 51a may increase and the protrusion 53 may no longer abut the bottom surface of the accommodating hole 51a. Thus, the gap 49 is preferably set equal to or greater than dimensions that enable the second piston 52 to tilt within the accommodating hole 51a and equal to or less than dimensions that enable the bottom surface of the accommodating hole 51a and the second piston 52 to abut each other via the protrusion 53. Further, as shown in FIG. 6, the gap 49 is preferably set to a size such that the distal end surface 52a of the second piston 52 does not abut the end surface 59a of the drain chamber 59 even if the second piston 52 comes out of the first piston 51 for some reason such as its own weight.

According to the above-described embodiment, the following operational effects are achieved.

Even if the angularity between the second end surface 56b of the spool 56 and the distal end surface 52a of the second piston 52 which contact each other is poor or the coaxiality between the inner periphery of the sleeve 61 in which the spool 56 slides and the piston hole 60b in which the piston 50 slides is poor, the second piston 52 can tilt within the accommodating hole 51a due to the existence of the gap 49 and the first piston 51 can receive a counterforce from the spool 56 at its center via the protrusion 53 of the second piston 52. Therefore, the sliding resistance of the first piston 51 on the piston hole 60b does not increase, and thus the thrust force of the piston 50 is efficiently imparted to the spool 56. Accordingly, the actual flow amount characteristics can be prevented from deviating from the planned flow amount characteristics.

In this way, the thrust force of the piston 50 is efficiently imparted to the spool 56 even if the angularity between the second end surface 56b of the spool 56 and the distal end surface 52a of the second piston 52 which contact each other is poor or the coaxiality between the inner periphery of the sleeve 61 in which the spool 56 slides and the piston hole 60b in which the piston 91 slides is poor. Therefore, the level of working precision for the spool 56, the piston 50, and the inner periphery of the sleeve 61 and the piston hole 60b in which the spool 56 and the piston 50 slide can be lowered to some extent. Thus, the manufacturing costs of the overall hydraulic control device can be reduced.

In the comparative example shown in FIG. 8, a certain level of effect can be obtained in that the thrust force of the piston 50 can be efficiently imparted to the spool 56 by providing a spherical protrusion at the center of the distal end surface 91a of the piston 91. However, in this case, the protrusion of the piston 91 abuts a plug 92 that blocks the pressure-introducing passage 68 formed in the spool 56. Thus, since the plug 92 receives the thrust force of the piston 91, the plug 92 may break.

Embodiments of this invention were described above, but the above embodiments are merely examples of applications of this invention, and the technical scope of this invention is not limited to the specific constitutions of the above embodiments.

For example, in the above-described embodiment, the spherical protrusion 53 is provided integrally with the second piston 52 at the center of the back surface of the second piston 52. However, instead of this constitution, the spherical protrusion 53 can also be provided by embedding a spherical ball in the center of the back surface of the second piston 52. Also, the back surface of the second piston 52 can be made flat, and a spherical protrusion can be integrally provided on or a spherical ball can be embedded in the center of the bottom surface of the accommodating hole 51a of the first piston 51. These constitutions can also achieve the same operational effects as those of the above-described embodiment.

This application claims priority based on Japanese Patent Application No. 2012-070672 filed with the Japan Patent Office on Mar. 27, 2012, the entire contents of which are incorporated into this specification.

The invention claimed is:

1. A fluid pressure control device comprising:
   a cylinder that extends/retracts to drive a load by a working fluid supplied from a pump;
   a control valve that switches supply/discharge of the working fluid to/from the cylinder to control an extension/retraction operation of the cylinder;
   a pilot valve that pilot operates the control valve by a pilot pressure;
   a main passage that connects the control valve to a load-side pressure chamber of the cylinder on which a load pressure by the load acts when the control valve is in a blocked position; and
   a load-retaining mechanism that is interposed in the main passage and retains the load pressure of the load-side pressure chamber when the control valve is in the blocked position,
   wherein the load-retaining mechanism comprises:
   an operated check valve that permits a flow of the working fluid from the control valve to the load-side pressure chamber while also permitting a flow of the working fluid from the load-side pressure chamber to the control valve according to a pressure of a back pressure chamber to which pressure of the load-side pressure chamber is constantly led via a restriction passage; and
   a switching valve that operates in conjunction with the control valve by a pilot pressure supplied via the pilot valve to switch an operation of the operated check valve,
   wherein the switching valve comprises:
   a pilot chamber to which the pilot pressure is supplied via the pilot valve;
   a spool that moves according to the pilot pressure of the pilot chamber; and
   a piston that is accommodated in the pilot chamber and imparts a thrust force to the spool upon receiving the pilot pressure at its back surface,
   wherein the piston comprises:
   a first piston that is slidingly accommodated in the pilot chamber and is acted upon by the pilot pressure at its back surface, and
   a second piston whose distal end faces an end surface of the spool and is inserted coaxially with the first piston into an accommodating hole formed in the first piston, and
   wherein a spherical protrusion is provided on a center of either one of a bottom surface of the accommodating hole of the first piston and a back surface of the second piston.

2. The fluid pressure control device according to claim 1, wherein a gap that enables the second piston to tilt within the accommodating hole is formed between an inner peripheral surface of the accommodating hole of the first piston and an outer peripheral surface of the second piston.

3. The fluid pressure control device according to claim 2, wherein the gap between the inner peripheral surface of the accommodating hole of the first piston and the outer peripheral surface of the second piston is set equal to or greater than dimensions that enable the second piston to tilt within the accommodating hole and equal to or less than dimensions that enable the bottom surface of the accommodating hole of the first piston and the second piston to abut each other via the protrusion.

* * * * *